Patented Aug. 17, 1943

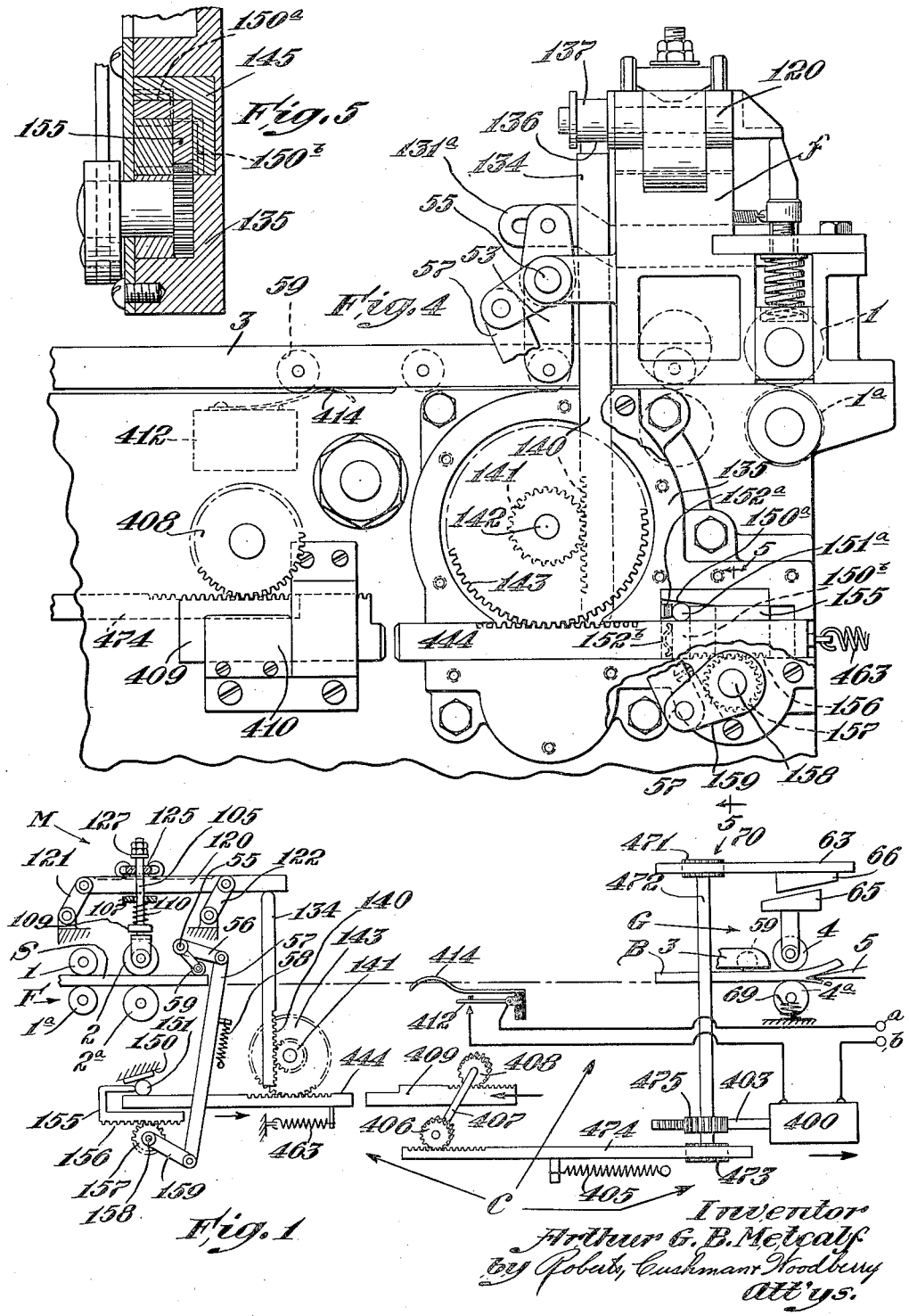

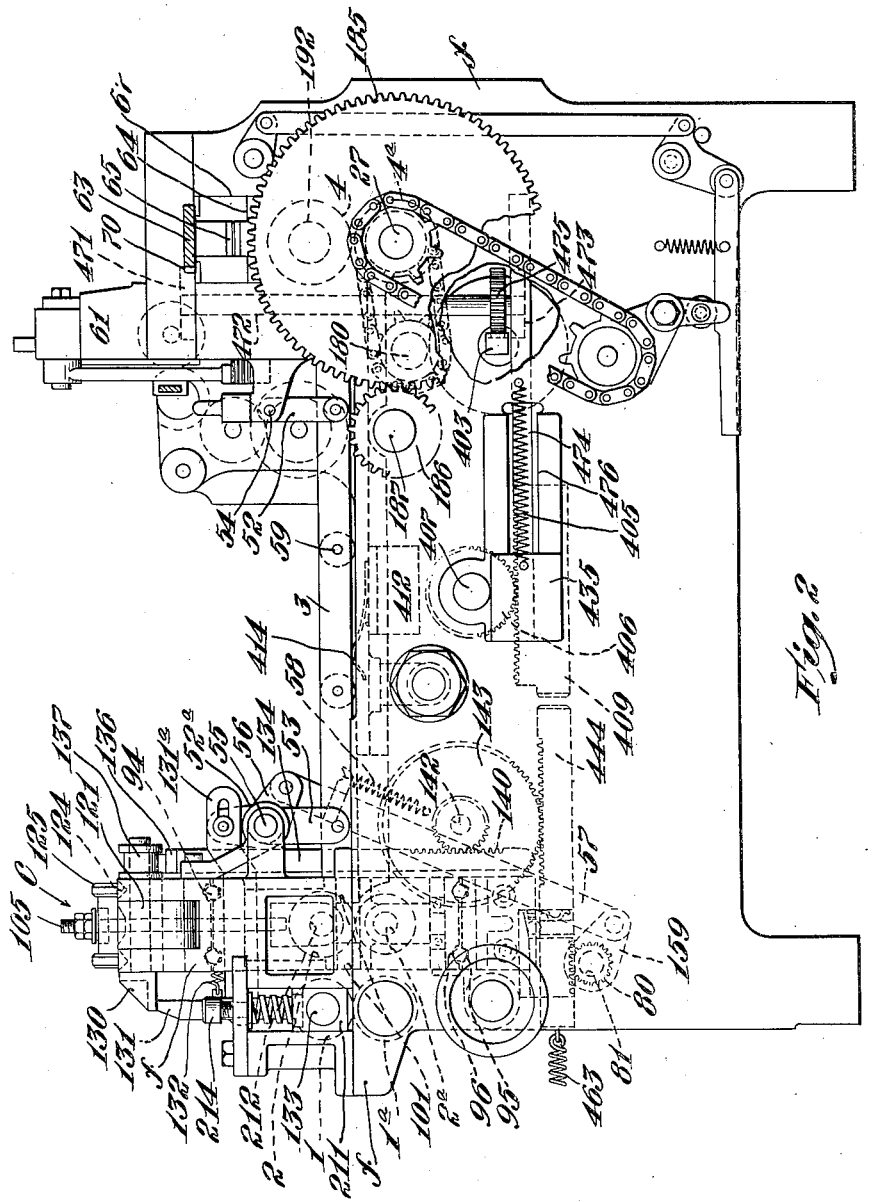

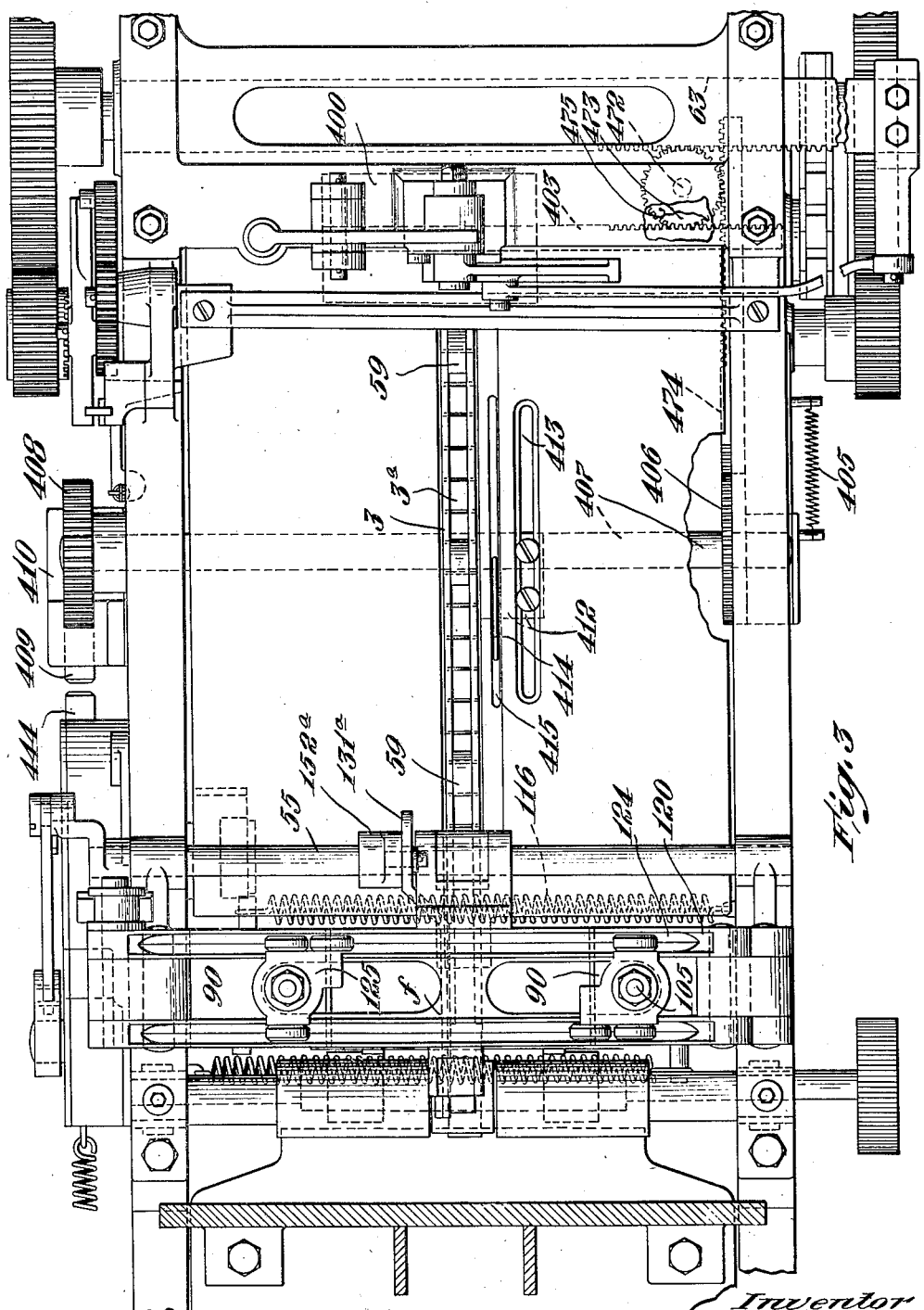

2,327,283

UNITED STATES PATENT OFFICE 2,327,283

GRADING MACHINE

Arthur G. B. Metcalf, Milton, Mass., assignor to North American Holding Corporation, Syracuse, N. Y., a corporation of New York Application April 23, 1941, Serial No. 389,854

3 Claims. (Cl. 33—147)

This invention relates to grading machines such as are used to grade shoe soles, taps and other blanks of stock used in the manufacture of shoes, and more particularly to the well-known Nichols type of grading machines illustrated in a series of patents granted to Elmer P. Nichols, Leander A. Cogswell, and James W. Johnston, of which the Johnston Patent No. 2,187,304, dated January 16, 1940, may be referred to as an example. A characteristic feature of such grading machines is that each blank is measured and graded in accordance with the thickness of the thinnest spot of the blank, or of a selected area of the blank, as determined by the detecting and measuring devices.

There are various kinds of grading operations performed by different species of grading mechanisms, and the term "grading," as established in this art, is a generic term and includes evening or skiving the blank as a whole down to the grade or thickness of its thinnest spot, stamping or marking each blank with a character indicating its thickness grade, indicating on a visual indicator the grades of the several blanks, and sorting or distributing the blanks in accordance with their grade measurements. Two or more species of grading mechanisms may be and commonly are contained in one machine and the term "grading" is used herein in its generic sense unless some particular kind of grading is specified. Whatever may be the kind or kinds of grading to be performed the appropriate grading mechanism or mechanisms are adjusted through setting and transmission apparatus in response to and in accordance with the thickness grade of each blank as determined by the detecting and gauging or measuring device, which acts on each blank as successive blanks are passed one by one through the machine. The measurements are usually made in terms of "irons" ($1/48$ of an inch), and the measurement transmitted to the grading devices is usually the thickness measurement in irons or fractions of irons which is nearest to but not greater than the thickness of the thinnest part of the blank as determined by the measuring device. In the machine herein illustrated only one type of grading mechanism is shown, namely, an evening or skiving mechanism, but it will be understood that additional or different species of grading mechanisms might be used, such as stamping or marking mechanism, visual indicators, and distributors, and all such species are within the scope of the claims.

Grading machines of the aforesaid type usually include measurement transmitting devices which involve translating a linear dimension or movement into a rotational or angular movement, thus introducing the usual cosine error, the magnitude of which depends upon the degree of amplification of the transmitted measurement and the range of thickness measurements which the machine is capable of measuring. Although it is possible to compensate for such errors, either by elaborate geometrical means or mechanically, as shown for example in United States Patent No. 2,180,591, both methods are complicated and add appreciably to the cost of manufacture of the machine, the latter method being subject to the further objection that it increases appreciably the mass of moving parts. Improved apparatus overcoming the aforementioned objectionable features and providing a grading machine which is capable of accurately measuring to any desired degree of precision the thickness of sheet material over a given range of thickness, without necessitating adjustment or substitution of parts, etc., is shown for example in my copending application Serial No. 366,853, filed November 23, 1940.

The aforementioned arrangements are purely mechanical and have certain disadvantages inherent in such devices. For example, the various above-mentioned mechanisms are mechanically interconnected, which involves rather complicated linkages and transmissions exerting more or less disturbing reactive forces upon the several component mechanisms introducing unavoidable bulkiness and limiting the grading speed which can be attained.

The principal object of the present invention is the separation, so far as mechanical force transmission is concerned, of measuring and grading mechanisms by introducing a member controlled by and responsive to the measuring mechanism and a grading control mechanism which has its own power supply, for example electrical motor means, and which is correlated to the controlled member for the purpose of moving the grading mechanism into proper positions as determined by that member.

Other objects are to provide a grading machine not requiring automatic feed; to provide a machine of this type whose grading mechanism is mechanically independent of any other mechanism of the machine; to provide an actuating force for setting the skiving mechanism of such machines, which force is independent of other motions of the machine and cannot exert reaction forces upon such other mechanism; and to relieve the measuring device of the mechanical work of actuating the transmitting or grading mechanisms, thereby insuring sensitiveness and accuracy in the operation of the measuring mechanism with simpler means than heretofore attainable.

Further objects relate to various features of construction and will be apparent from a consideration of the following description and the accompanying drawings wherein Fig. 1 is a diagrammatical representation of a grading machine described by way of example, including the electrical circuit;

Fig. 2 is a side elevation of the embodiment of a grading machine schematically shown in Fig. 1, as constructed in accordance with the present invention and including a skiving mechanism;

Fig. 3 is an enlarged top plan view showing the detecting means, measurement transmitting mechanism and associated parts;

Fig. 4 is an enlarged fragmentary side elevation of the measurement transmitting arrangement; and Fig. 5 is an enlarged section on line 5—5 of Fig. 4.

The machine to be described by way of example of a device according to the invention comprises several apparatus groups, indicated as follows in Fig. 1. The blanks S are supplied to the machine proper by a feeding arrangement F, they then pass through a measuring device M, and are graded by a grading mechanism G; measuring and grading devices are correlated by a setting and transmission apparatus C.

*Feeding arrangement and drive.*—The blanks S, as for example shoe soles, are positively delivered to the measuring device M by a pair of continuously driven feed rolls 1, 1a (Figs. 1, 2 and 4). These blanks may be automatically supplied to the feed rolls by appropriate arrangements, as for example from a hopper from the bottom of which they proceed forwardly one at a time. Such a feeding arrangement is for example, described in the above-mentioned copending application Serial No. 366,853, but not shown in detail herein, since the feeding of the blanks is not an essential feature of the present invention.

The blank proceeds then through the measuring device M with calipering rolls 2 and 2a, which device will be described in detail below. Upon emergence from these rolls, the blank is confined between a presser bar 3 supported from the frame by arms 52 and 53 (Fig. 2) and having rolls 50, and a continuously driven conveyor chain 3a (Fig. 3) passing over lower feed roll 1a and a sprocket on driven shaft 180 (Fig. 2). The presser bar is held downwardly by a spring 58 (Fig. 2) attached to rod 57 which is linked to the bar, as will be described more in detail below. On its way between presser bar and conveyor the blank passes a feeler 414 operating a control switch 412 (Figs. 1 and 2) and is then delivered to the rolls 4 and 4a of the grading device G.

The conveyor chain 3a is driven by a sprocket wheel (not shown, at the rear of the machine) on a transverse shaft 180 (Fig. 2), on which is also fixed a second sprocket wheel (not shown) connected by a chain (not shown) with a sprocket wheel fast on shaft 27 (Fig. 2) of the lower skiving roll 4a. Shaft 27 also has fixed to it a large gear wheel 185 (Fig. 2) which is driven by another gear wheel 186 fast on shaft 187. Shaft 187 is the continuously driven main shaft of the machine.

The main shaft 187 has also fixed to it a gear (not shown) driving shaft 182 of the upper skiving roll 4 (Fig. 2). The upper horizontal stretch of the conveyor chain 3a occupies a groove or channel of the bed plate which supports the chain. The end of this plate toward the measuring devices has a narrow extension between the two calipering casters, its free end projecting close to the feed rolls 1 and 1a so that the horizontal stretch of chain 3a is supported throughout approximately its entire length, as more fully shown in United States Patent No. 1,187,204.

The shaft 133 of the upper feed roll 1 (Fig. 2) is journaled in boxes 211 sliding in vertical ways provided on the frame of the machine, these boxes being yieldingly urged downwardly by springs 212. The upper ends of these springs bear against adjustable abutment screws 214. The continuously driven shaft of the lower feed roll 1a is journaled in fixed bearings on the frame of the machine and carries gears which mesh with driving gears on shaft 133 of the upper feeding roll.

*Measuring device.*—From feeding rolls 1, 1a the blank passes, as above mentioned, between the calipering rolls 2, 2a of a measuring mechanism.

The measuring mechanism herein shown by way of example is likewise described in detail in copending application Serial No. 366,853, so that it is herein only necessary to describe this mechanism as far as it is essential to the present invention.

The measuring mechanism M comprises a pair of yokes 90 (Fig. 3) mounted on frame f for travel transversely thereof on four races with balls 94 running in grooves 95 and 96 of frame and caliper yokes, respectively (Figs. 2 and 3).

The yokes have lower calipering rolls 2a, upper calipering rolls 2, and edge rolls 101, these rolls being supported on a bracket which is mounted on its yoke for rotation about a vertical axis and permits up and down movement of the upper calipering roll 2, on a spindle 105 (Fig. 1) which projects upwardly through appropriate slots of the machine frame (Fig. 3). Spindle springs 110 arranged between collars 109 of spindles 105 and rests 107 of yokes 90 (Fig. 1), urge rolls 2 downwardly against the blank, and the edge rolls 101 are urged inwardly by springs 116 (Fig. 3).

Spindles 105 carry at their upper ends three-wheeled rotatable carriages 125 (Figs. 2 and 3) running on grooves 124 of a transverse measuring bridge 120 (Figs. 1 and 3) which, together with links 121 and 122 and the machine frame to which these links are journaled, forms a four-bar parallel linkage system. Bridge 120 is at all times parallel to the path of the calipering yokes, irrespective of its upward and downward movement following the thickness variations of a blank S passing between rolls 2 and 2a. The spindles 105 can move upwardly through carriage 125 without lifting the latter, but downward movement of the spindles under the influence of the above-mentioned spindle springs 110 urging the rolls 2 downwardly against the blank, will be transmitted to bridge 120, which cannot be lifted, or held in position by spindle 105 and the calipering rolls.

In order to retain bridge 120 in elevated position, a bracket 130 (Fig. 2) is secured thereto which is normally held by a lever arm 131 urged thereunder by spring 132. The lower end of arm 131 is loosely mounted on shaft 133 carrying feed roll 1, this shaft being free to move up and down as the blank enters and leaves rolls 1 and 1a.

When a sole enters between the feed rolls 1 and 1ª, the shaft 133 is raised an amount equal to the thickness of the fore-part of the sole, elevating bridge 120 by means of lever arm 131 into readiness for receiving the sole blank to be measured. In order to release the bridge 120 so that it will be free to respond to the calipering rolls, the lever arm 131 is pivotally connected to a link 131ª (Figs. 2 and 3) which has a pin and slot connection with the upper end of an extension arm 52ª fast on a rock shaft 55 and on the above-mentioned arm 53 supporting presser bar 3 (Fig. 4).

This pin and slot connection not only serves to limit the inward movement of lever arm 131 and link 131ª under the influence of spring 132, but also causes these parts to move toward the left (Fig. 2) when the rock shaft 55 is rotated in a counterclockwise direction. Hence, when a sole blank enters beneath the forward end of the presser bar 3 (Figs. 2, 3, and 4), swinging the same rearwardly and effecting a counterclockwise rotation of rock shaft 55, lever arm 131 is pushed outwardly from beneath the bracket 130, thus releasing the bridge 120. When the blank leaves the presser bar, restoring it to its lowermost position, rock shaft 55 and extension 52ª are rotated in clockwise direction, thus permitting the spring 132 to restore the lever arm 131 to normal position beneath bracket 130, since, when the sole passes from beneath the feed rolls the arm 131 drops to a level below that of the bracket 130.

The downward movement of the bridge 120 affects a vertical push bar 134 mounted in guideways in the frame plate 135 (Figs. 1, 2 and 4). The upper end of the bar 134 has a flat head 136 engageable with a roller 137 mounted on bridge 120 (Figs. 2 and 4). The lower end of the bar 134 has teeth 140 which mesh with pinion 141 on shaft 142. The pinion 141 is secured to gear 143 which meshes with the teeth of rack 444, which constitutes a stop bar and is slidably mounted in suitable guideways of the frame. A tension spring 463 urges the bar 444 toward the left of Fig. 1, consequently holding the head 136 of bar 134 against the roller 137 of bridge 120, thus eliminating play within the transmission mechanism.

During the measuring of the blank by the calipering rolls the two spindles 105 will move up and down in response to differences in thickness of different parts of the blank but owing to the fact that (due to the arrangement of spindle 105) only downward movement is transmitted to the bridge 120 and associated parts, the stop bar 444, constituting a setting mechanism, can only be adjusted in response to successively thinner spots encountered by the calipering rolls.

Movement of the bar 444 to the right of Fig. 1 is in direct proportion to the maximum movement of the calipering rolls 2, 2ª and hence corresponds to the measurement of the thinnest part of the measured blank. Since it is desired to preserve only the thinnest measurement, corresponding to the maximum movement of bar 444 to the right of Fig. 1, means are provided to lock bar 444 against movement toward the right in response to thicker areas of the sole, during the period required to measure and grade soles passing through the machine, as follows.

The frame wall 135 has a chamber through which the left-hand end (Fig. 1) of bar 444 projects. An angular member 145 is mounted within this chamber, as shown more clearly in Fig. 5. The inner ends of each wing of the member 145 are tapered as indicated at 150ª and 150ᵇ (Figs. 1 and 5) and rollers 151ª and 151ᵇ are interposed between the inclined surfaces 150ª, 150ᵇ and the adjacent faces of the bar 444. Small leaf springs 152ª and 152ᵇ normally hold the rollers 151ª, 151ᵇ against the inclined surfaces 150ª, 150ᵇ, respectively, thus locking the bar 444 against movement toward the left of Fig. 1, due to the wedging action of the inclined surfaces. The stop bar 444 is therefore free to move toward the right of Fig. 1 in response to downward movement of the calipering rolls 2, but is locked against movement toward the left of Fig. 1 so long as the rollers are in contact with the inclined surfaces and the upper and inner faces of the bar 444.

In order to release the bar 444 it is merely necessary to disengage the rollers from the inclined surfaces, and to this end there is provided a release bar 155 (Figs. 1, 4 and 5), the lower edge of which has teeth 156 meshing with pinion 157 fast to the inner end of stub shaft 158. The outer end of shaft 158 carries an arm 159 which is pivotally connected to link 57. Link 57 is normally held downwardly by spring 58 (Figs. 1 and 2) and thus maintains the locking mechanism ineffective so long as the rolls 3ᵇ of presser bar 3 (Figs. 1, 3 and 4) are in their lowermost position. It will be noted that in this position the release bar 155 is held in engagement with the rollers 151ª and 151ᵇ so that they permit the rack bar 444 to be moved by spring 463 to the left of Fig. 1, to a position determined by the position of bridge 120. When the presser bar 3 is raised by a sole passing through the machine, the rock shaft 55 is rotated, causing withdrawal of the release bar 155 from the rollers 151ª, 151ᵇ and locking the stop bar 444 against movement toward the left of Fig. 1, which preserves the minimum measurement detected by the calipering rolls 2, 2ª. So long as the presser bar 3 is maintained in elevated position, the bar 444 remains locked.

It will be understood that the movement of stop bar 444 is directly proportional to the thickness of the thinnest spot of the marginal blank area as determined by either of the two calipering devices. This movement of stop bar 444 may be several times the corresponding movement of the calipering rolls 2, depending on the gear ratios of the transmitting mechanism.

*Grading mechanism.*—As the forward end of the blank, held by presser bar 3 firmly in engagement with the traveling conveyor 3ª, approaches the skiving rolls 4 and 4ª, it may operate a marking or stamping wheel of known construction, for example of the type described in the above copending application. During the operation of the machine a slide bar 63, controlling the stamping as well as the skiving mechanisms, is adjusted endwise and set in response to and in accordance with the thickness of the thinnest part of the blank as determined by the measuring mechanism, in the manner now to be described.

The upper skiving roll 4 (Figs. 1 and 2) is suitably mounted in bearing boxes 64 (Fig. 2) to move in vertical ways 67 on the frame of the machine. Each bearing box 64 is provided upon its top side, as usual in such machines, with a wedge block 65 (Figs. 1 and 2) cooperating with a similar inverted wedge block 66 adjustably secured to the under side of slide bar 63, as described in detail in the above copending application and schematically indicated in Fig. 1. The lower skiving roll 4ª is journaled in bearing boxes which are also mounted to slide in vertical ways and are yieldingly supported by a pair of stiff springs, one of which is indicated at 69 in Fig. 1.

When the forward end of a blank enters between the skiving rolls 4 and 4ª, the transverse slide bar 62 having previously been adjusted by the measuring mechanism in accordance with the thickness grade of that blank in the manner to be described below, the upper roll 4 is lifted until its pair of wedge blocks or abutments 65 engage and are stopped by the pair of abutments 66 on slide bar 63. The distance between roll 4 and the edge of the knife blade 5 (Fig. 1) now corresponds to the thickness of the thinnest spot of the blank as determined by the measuring mechanism and determines the thickness to which the blank will be evened or skived. Thicker areas of the blank will force the lower roll 4ª downwardly against the pressure of springs 69 and will be skived off by the knife 5.

*Setting and transmission apparatus.*—The slide bar 63 has a rack of teeth 70 (Figs. 1 and 2) meshing with a pinion 471 fixed to the upper end of a vertical shaft 472 journaled in bearings on the machine frame. At the lower end of shaft 472 is fixed a pinion 473 meshing with a rack bar 474 (Figs. 1, 2 and 4). The rack bar 474 is mounted in ways 475 (Fig. 2) on the machine frame and connected to a grading control bar 409 which is mounted to slide on ways in boss 410 (Fig. 4) of the machine frame. This connection is provided by gear wheels 406 and 408 on a shaft 407 (Fig. 1) and meshing with rack teeth on the upper edges of bars 474 and 409, respectively.

A spring 405 connects rack bar 474 with the machine frame at 435 (Figs. 1 and 2) urging the rack bar towards the right of Fig. 1, for the purpose of resetting slide bar 63 to original position.

Vertical shaft 472 (Figs. 1, 2, 3 and 4) has a further gear wheel 475 meshing with a transverse rack bar 403 attached to the armature of a solenoid 400 (Figs. 1 and 3), whose force is superior to that of spring 405.

Grading control bar 409 is aligned with stop bar 444 which is set by the measuring device M and fixed by the wedge and roller arrangement shown in Fig. 5, as above described. Solenoid 400 is supplied with suitable current from line a, b through a circuit including switch 412 (Fig. 1) which is open so long as feeler 414 is in raised position. A blank which has passed through the measuring device M and proceeds beneath presser bar 3 strikes feeler 414 which closes switch 412 thereby connecting solenoid 400 to current supply a, b and energizing it. This causes rack bar 403 to move towards the right, and grading control bar 409 towards the left of Fig. 1, until bar 409 meets stop bar 444. During this movement the solenoid has to overcome the force of spring 405 which, upon deenergization of solenoid 400, is in condition to return the grading mechanism into normal position as soon as the latter is released upon discharge of the blank from skiving rolls 4 and 4ª.

Feeler 414 and switch box 412 are movably mounted in a slot 413 (Fig. 3) which permits adjustment of the position of the feeler relatively to the measuring mechanism. Feeler 414 is so positioned as to be engaged by the forward end of the blank before its rear end leaves the calipering rolls. Hence the switch 412 comes into operation before the upper calipering rolls are released by the blank. By the adjustment of switch 412 lengthwise on the frame, in slot 413, the length of the part of the blank which is to be calipered may be varied.

After a blank has been marked, evened or otherwise graded, it is necessary to restore the stop bar 444 to its original position ready for another blank, with the spring 463 under tension. This may be accomplished by means actated by the feeding mechanism, as follows.

When the rear or trailing end of the blank passes out from beneath the presser bar 3 the spring 58 (Figs. 1 and 2) restores the presser bar to its normal depressed position and releases the locking mechanism 150—155 (Figs. 1 and 4). Thereupon the spring 463 restores the stop bar 444 and bridge 120 to their normal positions. At the time when the rear end of the blank moves out from under the presser bar 3 and the latter falls, the blank is between the feeding and skiving rolls 4 and 4ª. Under these conditions the transverse slide bar 63 is clamped immovably by the pressure of the lower wedge blocks 65 against the upper wedge blocks 66, and therefore remains locked against displacement until the blank is discharged from rolls 4 and 4ª. Solenoid 400 being at that time deenergized through opening of switch 412, spring 405 is free to move the skiving mechanism into normal position.

*Operation.*—Assuming that a blank has just been graded and discharged from the skiving rolls 4 and 4ª, the presser bar 3 will be in its depressed or lowermost position and through link 57 hold the locking mechanism in released position; the feeler 414 will be in elevated position, thereby opening switch 412 and rendering solenoid 400 ineffective; so that spring 405 has moved the grading mechanism into normal position. The frames 90 supporting the calipering rolls 2 and 2ª will be held by their springs 116 against the stops 118 and the lever arm 131 will be in position to lift bridge 120 upon the entrance of a sole between feed rollers 1 and 1ª.

If a blank S is now fed into the nip of the feed rolls 1 and 1ª; these rolls will seize the blank and advance it to the conveyor chain 3ª and between the two pairs of calipering rolls 2 and 2ª, carried by the two casters swiveled on frames 90, which are spread apart by the advancing blank.

At substantially the same time when the advance end of the blank enters between the calipering rolls it engages the forward end of the presser bar 3 and swings the bar to the right and slightly upward far enough for the blank to pass underneath it. This movement of the presser bar 3 operates the locking mechanism 150—155 through link 57 and releases the bridge 120 through the lever arm 131. This starts the effective measuring of the blank substantially simultaneously with the entry of the leading end of the blank between the detecting and calipering rolls, and therefore calipers the blank from its extreme forward end. So long as the locking mechanism operates, the measurement of successively thinner spots in the blank encountered by the calipering rolls 2 and 2ª will be transmitted to the stop bar 444 since it is free to respond to any downward movement of the calipering rolls 2, but any upward movement of calipering rolls 2 in response to thicker regions of the blank will not be transmitted.

As the blank advances through the machine, propelled by the conveyor chain 3ª, against which it is firmly held by the presser bar 3, it next encounters and depresses feeler 414, thereby closing switch 412 and energizing solenoid 400. The solenoid thereupon moves rack bar 403 to the right and grading control bar 409 to the left of Fig. 1, until the control bar meets stop bar 444. At the same time, slide bar 63 and hence the grading mechanism are adjusted in accordance with the then prevailing measurement of the thickness of the thinnest part of the blank as determined by either of the two calipering devices.

If any variations in thickness of the blank are subsequently encountered by the calipering rolls 2, 2ª, in that part of the blank which has not yet passed between the calipering rolls, such variations will not affect the measurement setting and transmission mechanisms, since the stop bar 444 cannot be further adjusted because it is now held between the locking device 150—155 and the solenoid 400, whose force is stronger than that of spring 405. This condition also prevents any further lowering of bridge 120 in response to thinner areas encountered in the blank after the forward end of the blank has passed feeler 414.

The blank next enters between the feeding and skiving rolls 4 and 4ª, whose abutment wedge blocks 66 were adjusted by the slide bar 63 according to the ascertained grade measurement when solenoid 400 was actuated, and the blank is skived or evened down by the knife blade 5 to a uniform thickness corresponding to the ascertained measurement of its thinnest spot.

When the rear or trailing end of the blank passes feeler 414, the latter opens switch 412 and deenergizes solenoid 400. This, however, will not disturb the adjustment of the grading devices since, as already explained, the slide bar 63 will be held against displacement by the clamping of the wedge blocks 65 and 66 so long as a blank is between the rolls 4 and 4ª.

After the blank has been discharged from between the skiving rolls 4 and 4ª it is withdrawn either manually or automatically, and the cycle of operations just described is repeated with respect to the next succeeding blank.

It should be understood that the present disclosure is for the purpose of illustration only and that this invention includes all modifications and equivalents which fall within the scope of the appended claims.

I claim:

1. In a grading machine wherein a controlled member is caused to assume different positions corresponding to grades, grading means, a grading control mechanism for adjusting said grading means, and electric motor means for moving said grading control mechanism into positions determined by said controlled member.

2. In a grading machine wherein a controlled member is caused to assume different positions corresponding to grades of blanks of stock successively passing through the machine, grading means, a grading control mechanism for adjusting said grading means, electric motor means for moving said grading control mechanism into positions determined by said controlled member, switch means for energizing said motor means, and feeler means for operating said switch means when a blank passes a predetermined point in its path through the machine.

3. In a grading machine wherein a unidirectionally shiftable stop member is caused to assume different positions corresponding to diminishing grades, grading means, a grading control mechanism for adjusting said grading means having a control member whose position can be determined by contact with said stop member, and electric motor means for moving said control member into contact with said stop member.

ARTHUR G. B. METCALF.